United States Patent
Gupta et al.

(10) Patent No.: US 10,169,602 B2
(45) Date of Patent: Jan. 1, 2019

(54) METHOD FOR LOCAL KEY MANAGEMENT SETUP AND RECOVERY

(71) Applicant: DELL PRODUCTS, L.P., Round Rock, TX (US)

(72) Inventors: Chitrak Gupta, Bangalore (IN); Rama Rao Bisa, Kandukur (IN); Sushma Basavarajaiah, Bangalore (IN); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 237 days.

(21) Appl. No.: 15/049,373

(22) Filed: Feb. 22, 2016

(65) Prior Publication Data

US 2017/0243021 A1   Aug. 24, 2017

(51) Int. Cl.
| | |
|---|---|
| *G06F 21/62* | (2013.01) |
| *G06F 17/30* | (2006.01) |
| *G06F 9/44* | (2018.01) |
| *H04L 9/08* | (2006.01) |
| *H04L 9/32* | (2006.01) |

(Continued)

(52) U.S. Cl.
CPC ........ *G06F 21/6218* (2013.01); *G06F 9/4416* (2013.01); *G06F 21/606* (2013.01); *H04L 9/0894* (2013.01); *H04L 9/3268* (2013.01)

(58) Field of Classification Search
CPC ........... G06F 21/6218; G06F 17/30979; G06F 9/4401; G06F 9/0819; G06F 9/0861; G06F 9/3263
See application file for complete search history.

(56) References Cited

U.S. PATENT DOCUMENTS

| | | | |
|---|---|---|---|
| 7,050,589 B2 | 5/2006 | Kwan | |
| 2008/0082813 A1* | 4/2008 | Chow | G06F 21/34 |
| | | | 713/2 |

(Continued)

FOREIGN PATENT DOCUMENTS

WO    WO 2013/152383    * 10/2013    ........... H04L 9/14

OTHER PUBLICATIONS

Managing Key Archival and Recovery, https://technet.microsoft.com/en-us/library/cc730721.aspx, downloaded from the internet Feb. 22, 2016.

*Primary Examiner* — Noura Zoubair
(74) *Attorney, Agent, or Firm* — Isidore PLLC

(57) ABSTRACT

A method and system for local key management setup and recovery includes receiving a lock request to secure one or more drives, then querying, for one or more key identifiers associated with a requesting device. The method includes: in response to receiving at least one key identifier, dynamically generating a first public-private key and a first public certificate associated with the at least one key identifier; and assigning the first public-private key and the first public certificate to the drives. The method further includes: concealing contents of the first public-private key and first public certificate; automatically transmitting the first public certificate to the first requesting device; and invoking the first public-private key to secure the drives. Finally, the method includes creating a recovery key, generating a recovery certificate associated with the recovery key, then, archiving the recovery key and the recovery certificate in a recovery database and a recovery server.

18 Claims, 9 Drawing Sheets

(51) Int. Cl.
*G06F 9/4401* (2018.01)
*G06F 21/60* (2013.01)

(56) References Cited

U.S. PATENT DOCUMENTS

| | | | |
|---|---|---|---|
| 2008/0301445 A1* | 12/2008 | Vasic | G06F 17/30067 713/171 |
| 2014/0258711 A1* | 9/2014 | Brannon | H04L 63/0823 713/156 |
| 2015/0121028 A1 | 4/2015 | Gupta | |
| 2015/0229476 A1* | 8/2015 | Lumb | G06F 21/62 713/193 |
| 2016/0132682 A1* | 5/2016 | Sudhakar | H04L 63/0823 713/2 |

* cited by examiner

METHOD FOR LOCAL KEY MANAGEMENT SETUP AND RECOVERY

BACKGROUND

1. Technical Field

The present disclosure generally relates to an information handling system and in particular to local key management setup and recovery in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may utilize local key management setup for securing storage devices. However, current local key management setups have inherent problems. These problems include use of easily detectable clear text user input passwords, an absence of password recovery mechanisms, an absence of device unlocking capabilities if the password management entity is unresponsive or dead, as well as an inability to provide password expiration management. Some of these issues have been mitigated through the use of a distributed key management (DKM) solution. DKM provides a solution for securely sharing data amongst multiple machines and multiple users (i.e., service accounts). DKM is a client-side library that allows users to encrypt data under a shared group secret key that enables only members of the group to access and decrypt the data. However, a DKM solution is expensive and requires additional management and equipment to be installed. Another security and recovery system, Bitlocker, has open, text-based keys generated by a local agent, which does not provide complete, reliable security.

BRIEF SUMMARY

Disclosed are a computer-implemented method and an information handling system (IHS) for local key management setup and recovery in an information handling system. The method includes receiving, at a service processor, from a first requesting device, a lock request to secure one or more drives. In response to receiving the lock request to secure the one or more drives, the method provides querying, by a security manager, for one or more key identifiers associated with the first requesting device. In one embodiment, the security manager is a module operating on the service processor. The method further includes, in response to receiving at least one key identifier at the security manager, dynamically generating, via the service processor, a first public-private key and a first public certificate associated with the at least one key identifier. The security manager assigns the first public-private key and the first public certificate to the one or more drives. The contents of the first public-private key and first public certificate are concealed. The service manager automatically transmits the first public certificate to the first requesting device. The first public-private key is then invoked to secure the one or more drives. The public-private key is encrypted to create a recovery key, and the public-private key is archived in a key database. A recovery certificate associated with the recovery key is generated by the service manager. The recovery key and recovery certificate are then archived in one or both of: at least one recovery database and at least one recovery server.

In another embodiment, the method includes receiving, at the service processor, an unlock request from a second requesting device to access one or more secure drives. The service processor dynamically searches the second requesting device for at least one key identifier and a public certificate associated with the one or more secure drives. In one embodiment, the at least one key identifier is one or more of (i) an electronic piece part identification (EPPID) unique to the second requesting device and (ii) a service tag unique to the second requesting device. In response to retrieving the at least one key identifier and the public certificate, a determination is made as to whether the public certificate includes content that corresponds with the at least one key identifier associated with the secure drives. In response to the public certificate including content that corresponds with at least one key identifier, the service processor dynamically retrieves a public key associated with the one or more secure drives. When the associated public key is received, the public key is invoked to enable access to the one or more secure drives.

In another embodiment, a portable storage device is utilized to retrieve and archive a recovery key and recovery certificate. The method includes receiving, at a recovery server, a request to retrieve and store at least one recovery key and at least one recovery certificate associated with at least one key identifier on a portable storage device. According to one aspect, at least one key identifier is input at a recovery server. The service manager validates the at least one key identifier associated with the at least one recovery key and at least one recovery certificate. The method includes detecting, at the recovery server, the portable storage device. In response to the request to retrieve and store at least one recovery key and at least one recovery certificate, the method includes retrieving and transmitting, from the recovery server to the portable storage device, a bootable operating system image, a recovery application, at least one recovery certificate, and at least one recovery key associated with the at least one key identifier. Then, the method includes temporarily storing the at least one recovery certificate and the at least one recovery key on the portable storage device.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
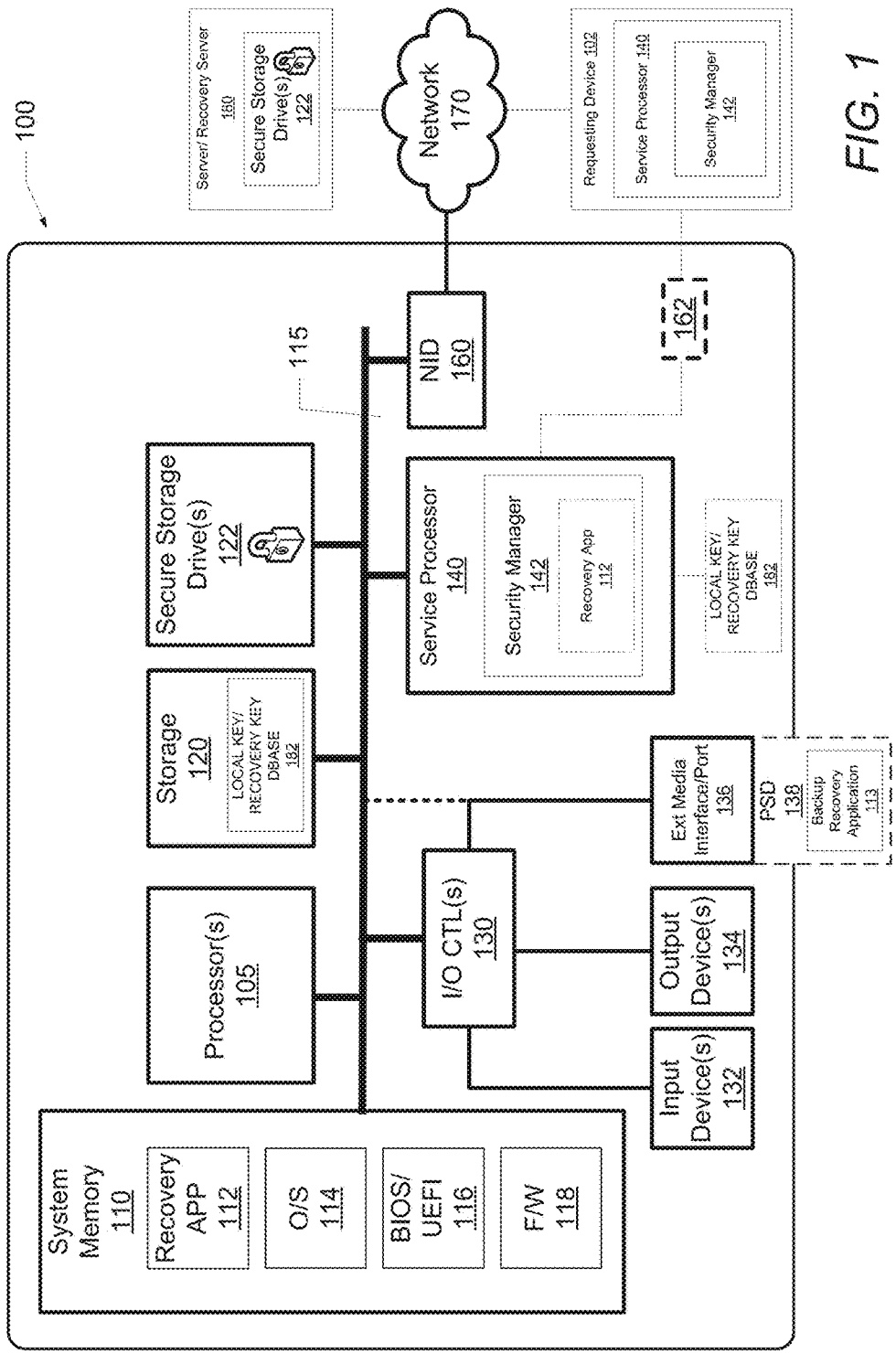
FIG. 1 illustrates an example information handling system having a service processor within which various aspects of the disclosure can be implemented, according to one or more embodiments.

The illustrative embodiments provide an information handling system (IHS) and a method performed within the information handling system for local key management setup and recovery. The method includes receiving at a service processor, from a first requesting device, a lock request to secure one or more drives. The method further includes: in response to receiving the lock request, querying, by a security manager, for one or more key identifiers associated with the first requesting device. Then, the method includes: in response to receiving at least one key identifier at the security manager, dynamically generating, via the service processor, a first public key and a first public certificate associated with the at least one key identifier. The security manager assigns the first public key and the first public certificate to the one or more drives and the contents of the first public key and first public certificate are concealed. The service manager automatically transmits the first public certificate to the first requesting device, the first public key is then invoked to secure the one or more drives. A public-private key associated with the first public key is generated by the service manager. The public-private key is encrypted to create a recovery key, and the public-private key is archived in a key database. The service manager generates a recovery certificate associated with the recovery key, and the recovery key and the recovery certificate are then archived in one or more of (i) at least one recovery database and (ii) at least one recovery server.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software utility, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. In one embodiment, local key and recovery key database 182 is maintained within storage 120. In another embodiment secure storage device 122 is also coupled to system interconnect 115. Similar to storage 120, secure storage device 122 can be a hard drive or a solid state drive, and stores one or more software and/or firmware modules and/or data. Secure storage device 122 may be local to IHS 100, or remotely accessible.

As shown, system memory 110 can include therein a plurality of software and/or firmware modules including application(s) 112, operating system (O/S) 114, basic input/output system/unified extensible firmware interface (BIOS/UEFI) 116 and other firmware (F/W) 118. The various software and/or firmware modules have varying functionality when their corresponding program code is executed by processor(s) 105 or other processing devices within IHS 100. During boot-up or booting operations of IHS 100, processor 105 selectively loads at least BIOS/UEFI driver or image from non-volatile ram (not shown) to system memory 110 to be stored as BIOS/UEFI 116. In one or more embodiments, BIOS/UEFI image 116 includes the additional functionality associated with unified extensible firmware interface and can include UEFI images and drivers.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). According to one aspect, IHS 100 also includes at least one external media interface/port 136 that may be coupled to I/O controller 130 or connected directly to system interconnect 115. External media interface/port 136 enables insertion of and/or interfacing with portable storage device (PSD) 138.

Additionally, IHS 100 includes service processor 140, which includes security manager module 142. In one embodiment, service processor 140 interfaces with local key/recovery key database 184 and can update and/or modify the contents of local key/recovery key database 184. In one embodiment, communication with service processor 140 is provided via communication interface mechanism 162, which may enable service processor 140 to communicate with an external device or network and/or a portable storage device (not shown) or another external storage device. In one embodiment, security manager 142 generates one or more keys and associated certificates (public-private key/certificate and recovery key/certificate) to manage accessibility to secure storage device 122, and stores the generated keys and certificates on local key/recovery key database 184 and/or an external storage device. Additional aspects of service processor 140 and functionality associated with security manager module 142 are presented within the description of FIGS. 2 and 3.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprises multiple devices located across a distributed network, and NID 160 enables IHS 100 to be connected to these other devices. Network 170 can be a local area network, wide area network, personal area network, and the like, and the connection to and/or between network and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet. These other devices may include, but are not limited to requesting device 102, and recovery server 180. In one embodiment, network 170 communicates with one or more requesting devices such as requesting device 102. Within the description, requesting device 102 may represent a first requesting device as well as a second requesting device when performing a different function. However, it is appreciated that the functions described as being performed by different requesting devices, i.e., the first requesting device and the second requesting device, can be performed by the same, single, requesting device, in an alternate embodiment.

In one embodiment, recovery server 180 provides software and hardware capabilities to enable recovery of one or more keys required to access secure storage drives 122. Recovery server 180 may be configured to have capabilities identical to IHS 100. Recovery server 180 may communicate with and be accessed by IHS 100, requesting device 102, and/or directly by a recovery administrator, whereby PSD 138 is utilized to obtain one or more recovery keys. In another embodiment, recovery server 180 locally stores and/or enables remote access to one or more secure storage device 122. It is appreciated that the embodiments, which encompass recovery server 180, may define one unit or multiple units to carry out the functions of recovery server 180.

In one embodiment, requesting device 102 is a device utilized to gain access to one or more secure storage devices. Requesting device 102 may be implemented utilizing at least one of three configurations and/or architectures. In one embodiment, a first architecture enables requesting device 102 to provide software and hardware capabilities identical to IHS 100. In another embodiment, a second architecture enables requesting device 102 to include at least a service processor, such as service processor 140, and security manager 142. Service processor 140 enables local and remote management of requesting device 102. Requesting device 102 may obtain accesses to secure storage device 122 (of recovery server 180) via a network, such as network 170. In a third architecture, which represents an alternate embodiment, requesting device 102 may or may not have access to service processor 140; however, requesting device 102 includes and/or provides accessibility to an external media/port, such as external media/port 136, which enables access to a portable storage device such as PSD 138.

In one embodiment, application(s) 112 is and/or includes a recovery application that is executed by service processor 140 to perform public key recovery functions, described hereafter. For purposes of the description, application(s) 112 shall hereafter be referred to as recovery application 112. In another embodiment, recovery application 112 is located on service processor 140, and recovery application 112 can be accessed during operations of service processor 140.

In an alternate embodiment, recovery application 112 operates independently of service processor 140, when service processor 140 is unavailable. In this embodiment, recovery application 112 can be operable from within PSD 138 and/or via a remote or local server. Recovery application 112 may operate in conjunction with operating system 114. A recovery application, such as backup recovery application 113 and a bootable operating system (such as operating system 114) are stored on PSD 138. When requesting device 102 is communicatively coupled to PSD 138, and in response to detecting certain definable conditions (e.g., a loss of connectivity of service processor 140), backup recovery application 113 on PSD 138 can be executed by requesting device 102 to provide certain key security features of service processor 140 and security manager 142. These key security features are discussed in further detail and are particularly illustrated using FIG. 2B.

Figure 2B:
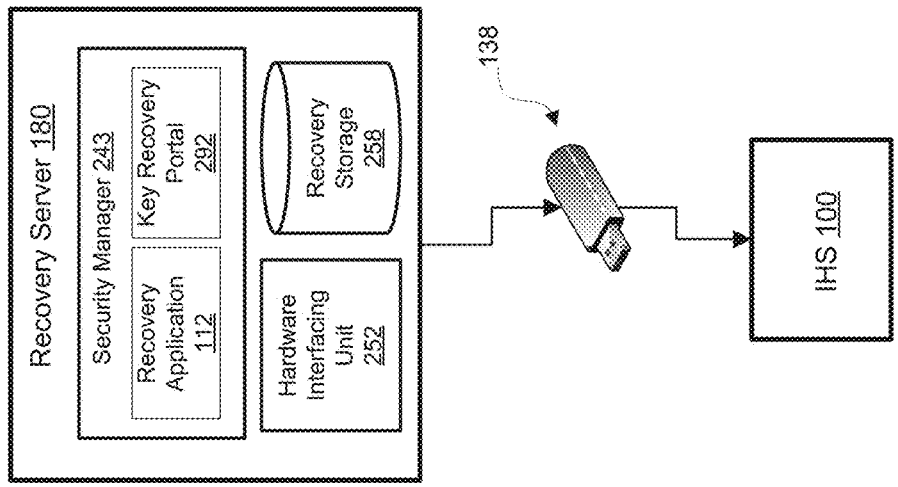
FIG. 2B illustrates example hardware and firmware/software components of a recovery server utilized for key management and retrieval when the service processor is not available, in accordance with one embodiment.
Figure 2A:
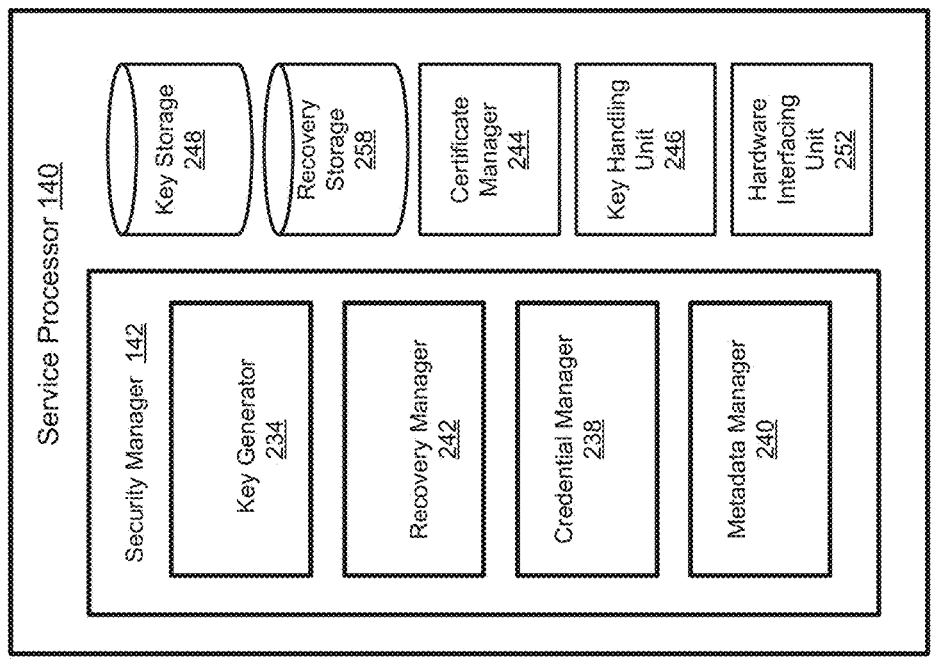
FIG. 2A illustrates example hardware and firmware/software components of the service processor of FIG. 1 that are utilized for key management and retrieval, in accordance with one embodiment.

With reference now to FIG. 2A, there is illustrated example contents of service processor 140 of information handling system 100. In the description of FIG. 2A, reference will also be made to components of FIG. 1. Service processor 140 includes a plurality of functional firmware and/or software modules including security manager 142, which includes or enables access to key generator 234, recovery manager 242, metadata manager 240, credential manager 238, certificate manager 244, key handling unit 246 and hardware interfacing unit 252. Service processor 140 can also include hardware components, such as recovery storage 258 and key storage 248. Recovery storage 258 and key storage 248 may be locally attached to service processor 140 or to IHS 100. Alternatively, recovery storage 258 and key storage 248 can be located remote to IHS 100 within recovery server 180.

Key generator 234 provides keying and key regeneration operations. Recovery manager 242 provides recovery key and rekeying operations. The recovery key, provided by recovery manager 242, is an encrypted personal information exchange (PFX) file format containing the private and public key pair for locking one or more files and/or storage devices. In one embodiment, the .PFX file is a public-key cryptography standards (PKCS#12) archive, which contains the encrypted and securely stored private and public certificates. Additionally, recovery manager 242 interfaces with recovery application 112 (or backup recovery application 113) to generate a new key (or rekey) to secure one or more storage devices after recovery application 112 is utilized to obtain access to one or more secure storage devices. Credential manager 238 handles key and certificate credentials. Metadata manager 240 curates server identifiers and handles properties with respect to the key certificate. Certificate manager 244 handles distribution of the certificates. Key handling unit 246 manages the distribution of keys to requesting devices and storage devices. Key storage 248 stores public-private keys, as well as certificates. Recovery storage 258 stores recovery keys and recovery certificates. Hardware interfacing unit 252 enables the service processor to communicate with additional hardware.

In one embodiment, at least one communication mechanism, such as communication mechanism 162 (of FIG. 1), is communicatively coupled to service processor 140. The communication mechanism enables communication and data exchange via hardware interfacing unit 252 between service processor 140 and at least one external electronic device and at least one storage device. The at least one storage device includes, but is not limited to recovery storage 258 and key storage 248. System memory 110 (of FIG. 1) is communicatively coupled to service processor 140 and includes security manager module 142 that executes on service processor 140.

In one embodiment, first requesting device 102 receives a lock request to secure one or more drives. In response to receipt of the lock request, service manager module 142 will query for one or more key identifiers associated with the first requesting device. In one embodiment, the one or more key identifiers are dynamically retrieved via metadata manager 240. In another embodiment, the one or more key identifiers are inputted via a user. The key identifiers may be one or more of an e-mail address, a common name, an organization unit name, a locality name, etc. In one embodiment, the common name is automatically filled in with the Electronic Piece Part Identification (EPPID). Additional key identifiers associated with the certificate creation provide unique credentials for additional security. A generated public-private key and the associated EPPID and/or key identifiers are utilized to secure one or more drives.

In another embodiment, in response to receipt of at least one key identifier at security manager module 142, service processor 140 dynamically generates, via key generator 234, a first public-private key and a first public certificate associated with the at least one key identifier.

In one embodiment, during start up of service processor 140, a request is received to unlock one of more data drives. Service processor 140 dynamically receives the EPPID of requesting device 102. Requesting device 102 dynamically searches for an associated public certificate (first public certificate). When a first public certificate is detected, the first public certificate is forwarded to service processor 140 to determine the EPPID and/or key identifier content associated with the detected first public certificate. The request is validated when the EPPID and/or key identifier of requesting device 102 corresponds with the EPPID and/or key identifier content of the first public certificate. The validation of the request triggers/enables transmission of the first public key from the first public certificate to unlock the one or more drives. In one embodiment, the request is validated when the EPPID and/or key identifier of requesting device 102 corresponds with the EPPID and/or key identifier content of the private key. With this embodiment, the validation enables transmission of the first public key, pending validation by the private key, to unlock the one or more drives.

With reference now to FIG. 2B, there are illustrated example hardware and firmware/software components of recovery server 180 utilized for recovery of one or more recovery keys (encrypted public-private keys). In the description of FIG. 2B, recovery server 180 is configured to have capabilities identical to IHS 100; therefore, reference will also be made to components of FIG. 1. Recovery server 180 enables access and communication with a plurality of functional firmware and/or software modules of FIG. 2A including security manager 243, key generator 234, recovery manager 242, and metadata manager 240. Security manager 243 of recovery server 180 is similar to security manager 142. However, security manager 243 additionally includes recovery application 112 and key recovery portal 292. Key recovery portal 292 is a graphical user interface that enables the input of credentials for recovery key retrieval. Additionally, recovery server 180 includes hardware components such as recovery storage 258 and hardware interfacing unit 252, without limitation to the number and types of hardware components contained therein. Recovery storage 258 may be locally attached to recovery server 180. Alternatively, recovery storage 258 can be located remote of recovery server 180. In addition to recovery storage 258, recovery server 180 can be configured to interface with and store recovery data at portable storage device 138, which may be a universal series bus (USB) storage device (or USB drive), for example. As shown, PSD 138 can be used to interface with IHS 100 as well, particularly during recovery operations.

In one embodiment, the service processor at requesting device 102 is inaccessible (e.g. hardware malfunction, corrupt firmware, corrupt memory subsystem, etc.). Therefore, the recovery keys that can be used to access one or more secure storage devices (e.g. secure storage device 122) are obtained by utilizing portable storage device 138. The recovery server administrator utilizes portable storage device 138, such as a universal serial bus (USB) drive to obtain one or more recovery keys via recovery server 180. In this embodiment, recovery server 180 is configured similarly to IHS 100. The recovery server administrator launches recovery application 112, which enables access to key recovery portal 292. The credentials (e.g. EPPID and/or key identifier) associated with secure storage device 122, to which access is sought, is received by key recovery portal 292 (from recovery server administrator). The credentials are authenticated via credential manager 238. After authentication of credentials, the one or more recovery keys associated with the authenticated credentials are retrieved from recovery storage 258. Security manager 243 then transmits a bootable operating system image (for example a Linux image), a recovery application (such as recovery application 112), and the one or more retrieved recovery keys and/or recovery certificates to the memory of PSD 138. When PSD 138 is inserted into and/or otherwise placed in communication with requesting device 102, requesting device 102 is restarted and boots from PSD 138 executing the operating system on PSD 138. Recovery application 112, on PSD 138, dynamically verifies the EPPID and/or key identifiers associated with requesting device 102. When the credentials (EPPID and/or key identifier) associated with recovery keys on PSD 138 (retrieved from recovery server 180) correspond with credentials (EPPID and/or key identifier) on recovery device 102, access is enabled to the corresponding secure storage drives 122. In one embodiment, a new public-private key(s) is generated to rekey secure storage drives 122, and the recovery keys are dynamically deleted from PSD 138 after a first time use.

According to one or more aspects, the one or more public-private keys associated with one or more secure storage drives (secure storage drives 122) are lost and/or become corrupt. When PSD 138 is inserted into and/or otherwise placed in communication with a requesting device, such as IHS 100, IHS 100 is restarted and boots from USB 138 executing the operating system on USB 138. Recovery application 112, on PSD 138, dynamically verifies the EPPID and/or key identifiers associated with IHS 100. In one embodiment, recovery server administrator credentials are required to initiate reprogramming/regeneration of one or more secure storage drives 122. Executing from PSD 138, recovery application 112 reprograms the one or more public-private keys and certificates, and stores the keys and certificates within key storage 248 and recovery server 180, respectively.

Figure 3:
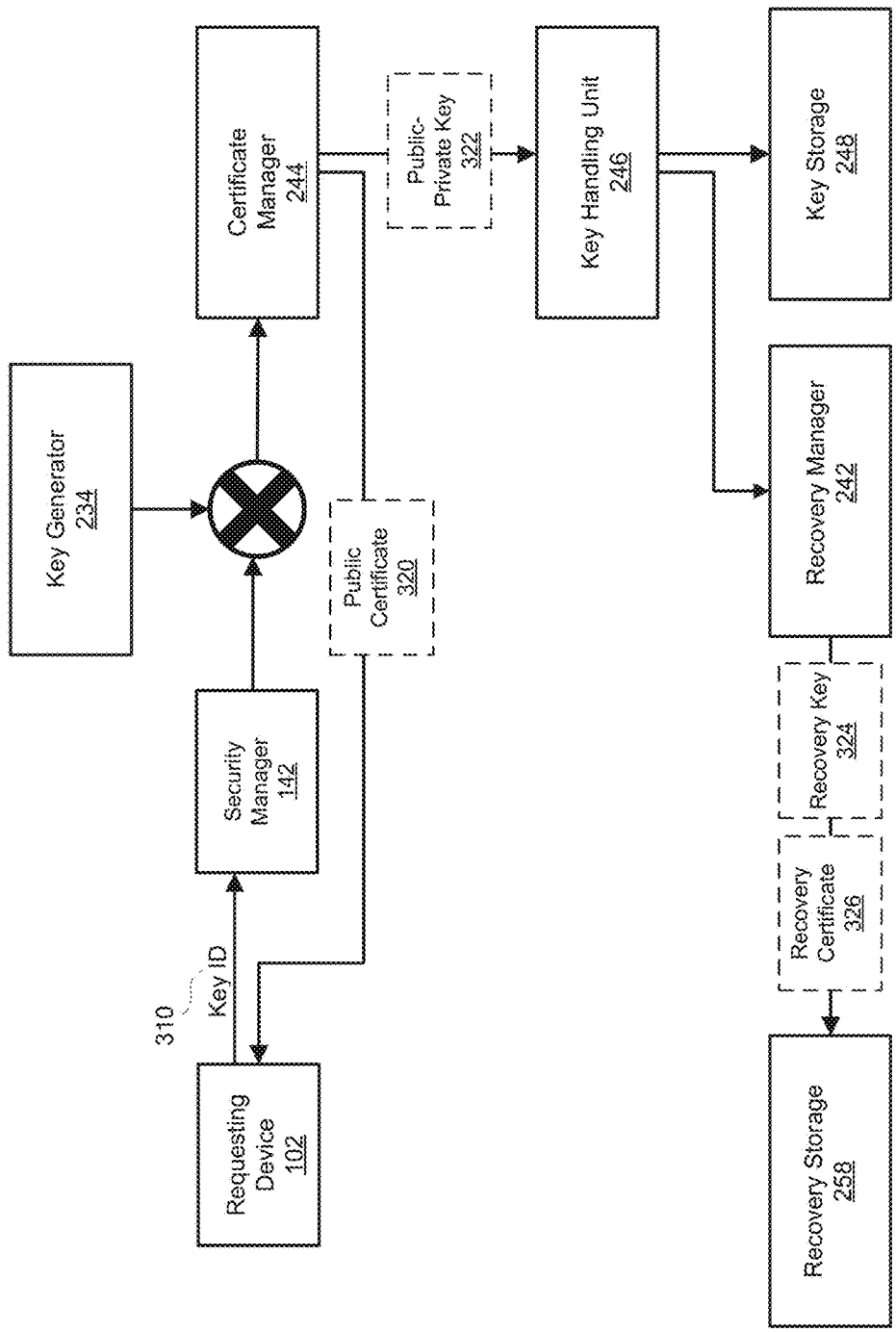
FIG. 3 illustrates a recovery key and recovery certificate management system, in accordance with one embodiment.

FIG. 3 illustrates a recovery key and recovery certificate management system. The recovery key and recovery certificate management system comprises requesting device 102, key ID 310, security manager 142, key generator 234, certificate manager 244, public certificate 320, public-private key 322, key handling unit 246, key storage 248, recovery manager 242, recovery key 324, recovery certificate 326, and recovery storage 258.

In one embodiment, requesting device 102 sends one or more key identifiers (310) to security manager 142. Key identifier (ID) 310, such as the EPPID of requesting device 102 (referenced as first requesting device, for device tracking purposes, where multiple requesting devices are possible), is associated with public-private key 322 generated via key generator 234. The generated public-private key 322 is transmitted to certificate manager 244. Certificate manager 244 assigns public-private key 322 (e.g., a first public-private key) and public certificate 320 (e.g., a first public certificate) to one or more drives. Certificate manager 244 conceals contents of public-private key 322 and public certificate 320. Certificate manager 244 automatically transmits public certificate 320 to the requesting device 102. Then, certificate manager 244 invokes public-private key 322 to secure the one or more drives.

In another embodiment, key generator 234 generates public-private key 322 associated with the requesting EPPID and/or received key identifier 310. Key generator 234 transmits public-private key 322 to key handling unit 246, via certificate manager 244. Key handling unit 246 manages the distribution of keys to recovery manager 242 and key storage 248. Public-private key 322 is archived in key storage 248. In one embodiment, recovery manager 242 engages the PFX file format to encrypt public-private key 322 to create recovery key 324. Recovery manager 242 generates recovery certificate 326 associated with recovery key 324. Recovery key 324 and recovery certificate 326 are then archived in recovery storage 258, which may be one or more of (i) at least one recovery database (e.g., local recovery key database 184 and (ii) recovery server 180).

FIGS. 4, 5, 6, 7, 8, and 9 illustrate flowcharts of exemplary methods 400, 500, 600, 700, 800, and 900 by which processor 105 and service processor 140 within the preceding figures performs different aspects of the processes that enable the one or more embodiments of the disclosure. The description of methods 400, 500, 600, 700, 800, and 900 are provided with general reference to the specific components illustrated within the preceding FIGS. 1-3. Generally, methods 400, 500, 600, 700, 800, and 900 represent computer-implemented methods for local key management setup and recovery in an information handling system. Also, methods 400, 500, 600, 700, 800, and 900 are generally described as being implemented via processor 105 and service processor 140 and particularly the execution of code provided by security manager module 142 on service processor 140 and/or recovery application 112 (or backup recovery application 113) acting within processor 105. It is however appreciated that certain aspects of the described methods may be implemented via other processing devices and/or execution of other code.

More specifically, the following flowcharts of FIGS. 4, 5, 6, 7, 8, and 9 disclose specific functionality provided by security manager module 142 an/or a recovery application such as recovery application 112 and/or backup recovery application 113. According to one embodiment, security manager module 142 and recovery application 112 (or backup recovery application 113) includes program code that respectively configures service processor 140 and processor 105 to provide the various functions described within the present disclosure.

Figure 4:
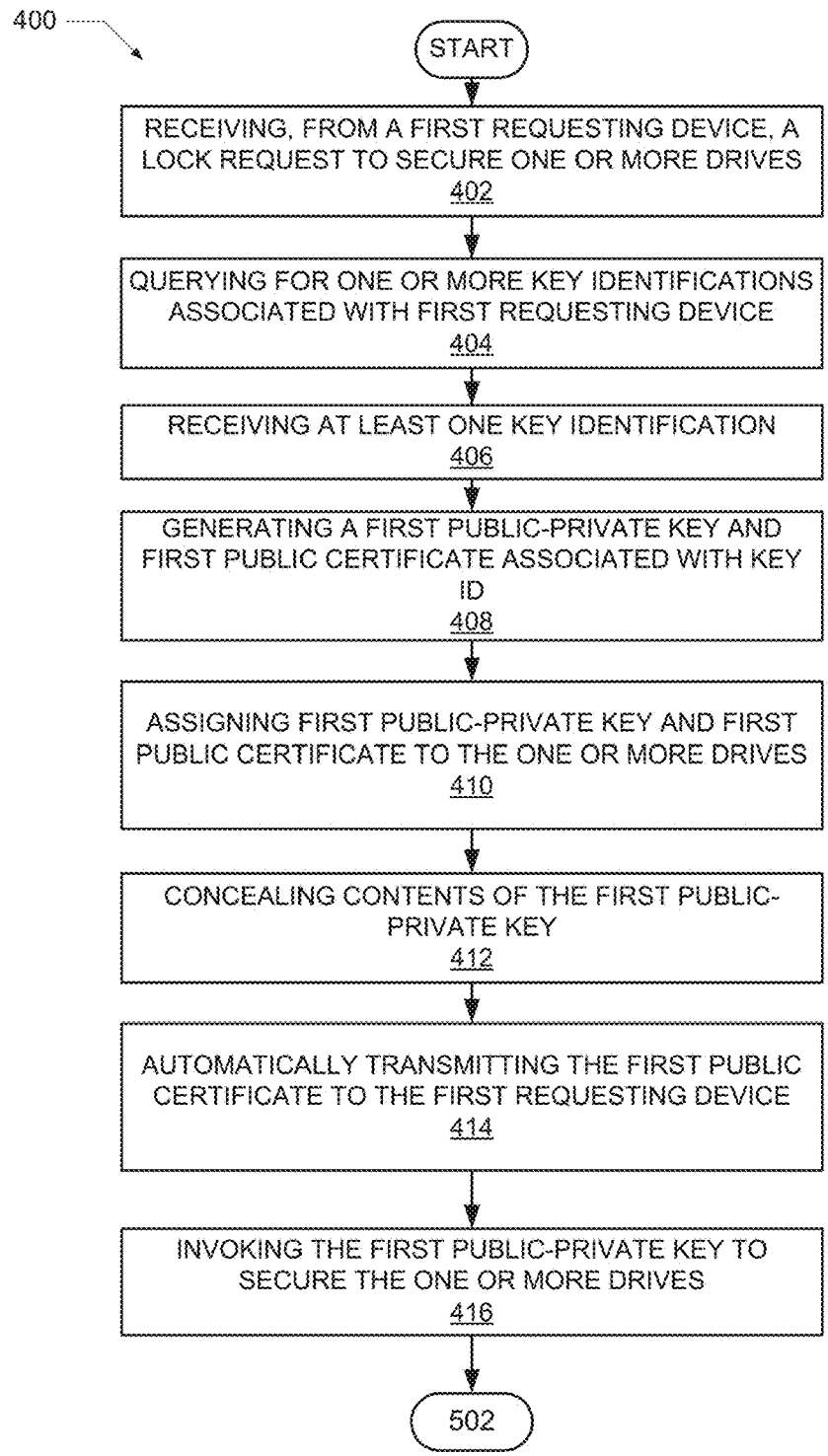
FIG. 4 is a flow chart illustrating one example of a method for securing one or more drives in an information handling system, according to one or more embodiments.

Referring now to the flow charts and specifically to FIG. 4, method 400 begins at the start block and proceeds to block 402 where method 400 includes receiving (at an information handling system), from a first requesting device, a lock request to secure one or more drives. Method 400 proceeds to block 404 where in response to receiving the lock request to secure the one or more drives, method 400 includes querying, by a security manager, for one or more key identifiers associated with the first requesting device. According to one aspect, the security manager is a module operating on a service processor within the information handling system. Then, method includes receiving at least one key identifier (block 406). In response to receiving at least one key identifier at security manager module 142, method 400 includes dynamically generating, via the service processor, a first public-private key and a first public certificate associated with the at least one key identifier. At block 410, method 400 provides that the first public-private key and the first public certificate are assigned to the one or more drives. Then, the contents of the first public-private key and first public certificate are concealed (block 412). At block 414, method 400 provides that the security manager module automatically transmits the first public certificate to the first requesting device. Once the first public certificate is transmitted to the first requesting device, the security manager module continues the process by invoking the first public-private key to secure the one or more drives (block 416). The method continues to block 502 (FIG. 5).

Figure 5:
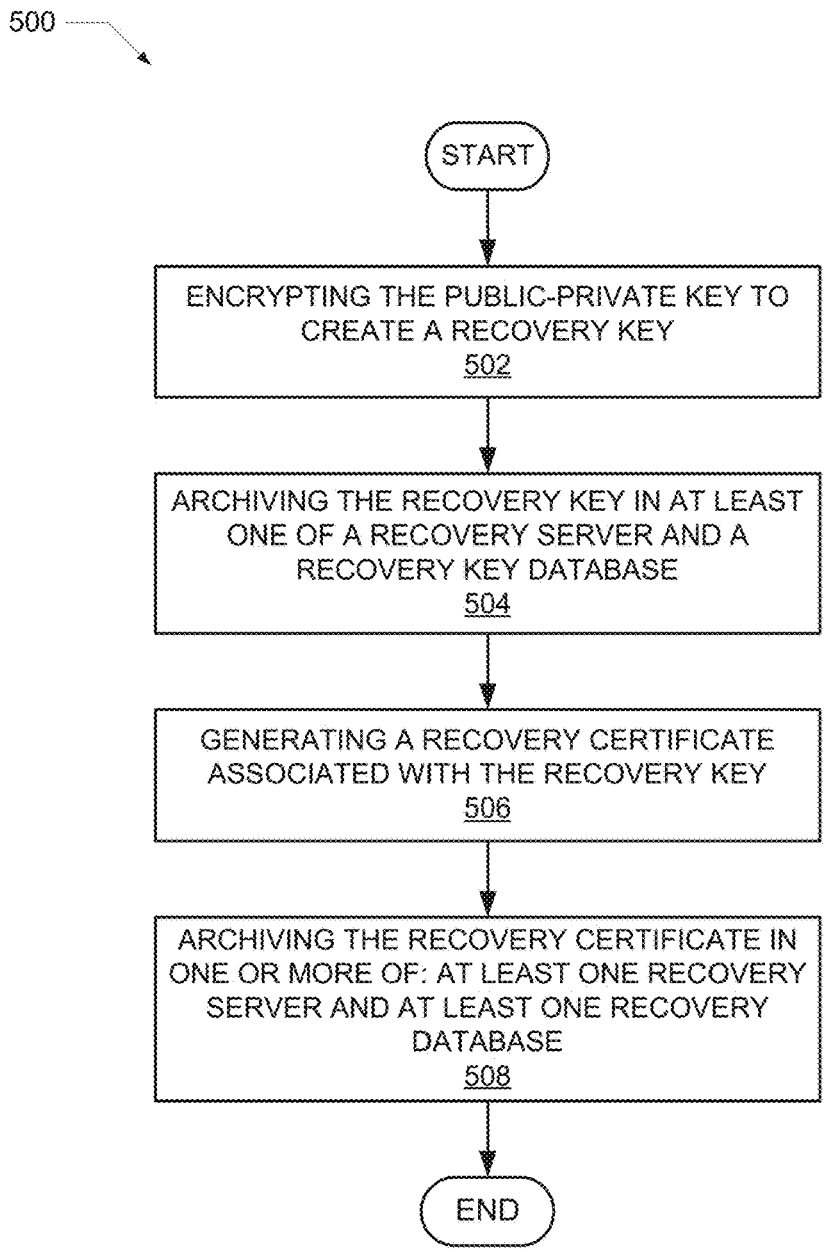
FIG. 5 is a flow chart illustrating an example of a method for generating and archiving a recovery key and certificate in an information handling system, in accordance with one or more embodiments.

Turning now to FIG. 5, which illustrates a method for generating and archiving a recovery key and certificate in an information handling system. Method 500 begins at the start block and proceeds to block 502, where the method includes receiving, at the security manager module, a request for encrypting a public-private key to create a recovery key. The public-private key is then archived in at least one of a recovery server and a recovery key database (block 506). Method 500 further includes generating a recovery certificate associated with the recovery key (block 508), followed by archiving the recovery key and the recovery certificate in one or more of: at least one recovery database and at least one recovery server (block 510). The process concludes at the end block.

Figure 6:
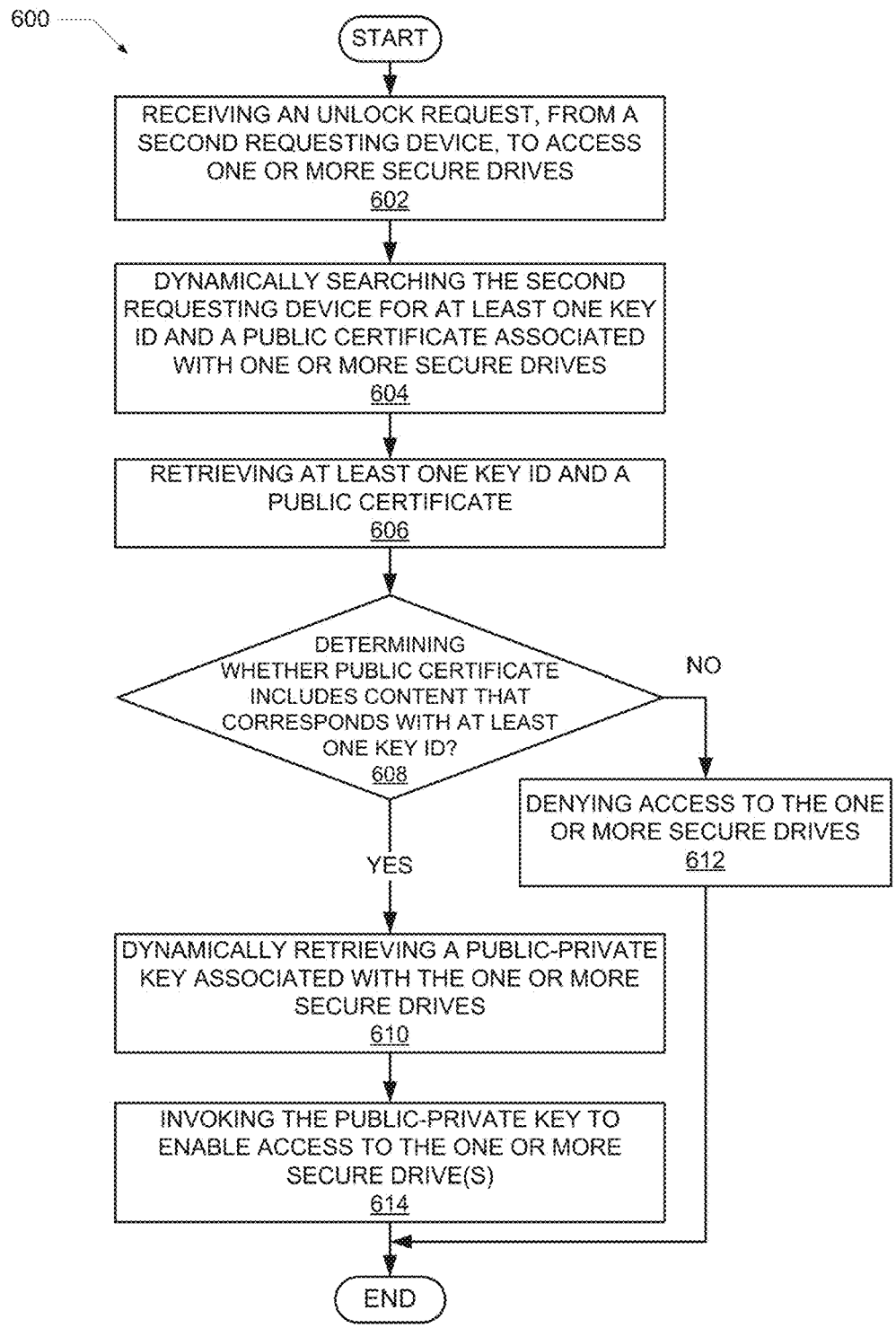
FIG. 6 is a flow chart illustrating one example of a method for invoking a public-private key to access one or more secure drives in an information handling system, according to one or more embodiments.

The flow chart of FIG. 6 describes a method for invoking a public key to access one or more secure drives in an information handling system. Method 600 begins at the start block and proceeds to block 602, where the method includes receiving, at the service processor, an unlock request from a requesting device to access one or more secure drives. The requesting device can be the first requesting device or a second requesting device, which generally represents any other device that can access the secured drives via use of a unique public key and device/user information that is verifiable by the described processes. At block 604, method includes dynamically searching the second requesting device for at least one key identifier and a public certificate associated with the one or more secure drives. In one embodiment, the at least one key identifier is one or more of (i) an electronic piece part identification (EPPID) unique to the requesting device and (ii) a service tag unique to the requesting device. In response to retrieving the at least one key identifier and the public certificate, at block 606, method 600 includes determining, at block 608, whether the public certificate includes content that corresponds with the at least one key identifier. In response to the public certificate not including content that corresponds with at least one key identifier, method 600 includes denying access to the one or more secure drives, at block 610. In response to the public certificate including content that corresponds with at least one key identifier, method 600 includes dynamically retrieving a public-private key associated with the one or more secure drives (block 612). At block 614, method 600 includes invoking the public-private key to enable access to the one or more secure drives. The process concludes at the end block.

Figure 7:
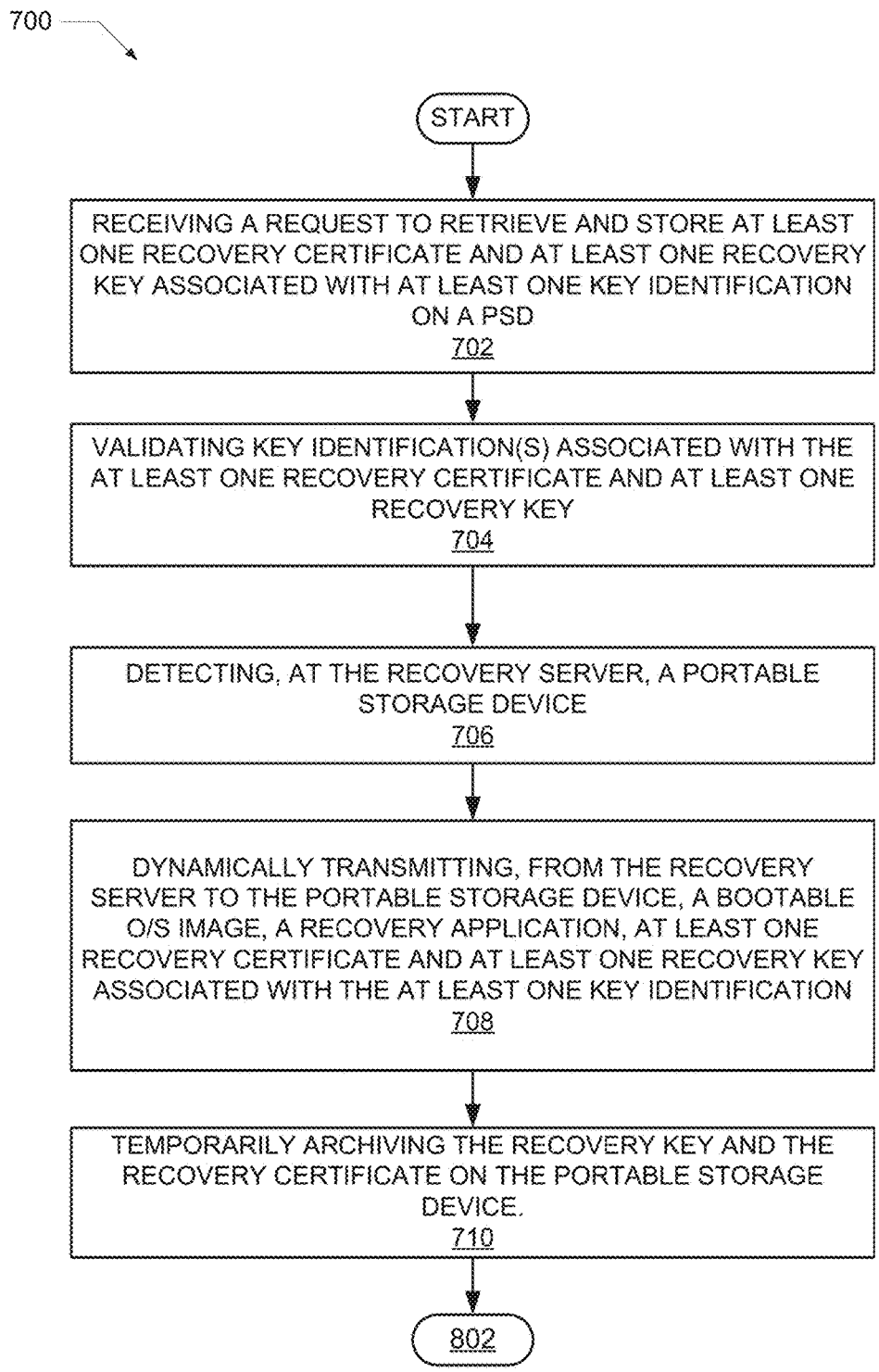
FIG. 7 is a flow chart illustrating one example of a method for retrieving and archiving a recovery key and certificate on a portable storage device, in accordance with one or more embodiments.

The flow chart of FIG. 7 describes a method for retrieving and archiving a recovery key and certificate on a portable storage device (e.g., PSD 138). Method 700 is performed at recovery server 180, which can be configured similar to IHS 100. Method 700 begins at the start block and proceeds to block 702 at which method 700 includes the processor of recovery server 180 receiving a request to retrieve at least one recovery key and at least one recovery certificate associated with at least one key identifier, and store the recovery key and recovery certificate on a PSD. According to one aspect, at block 704, the service manager validates the at least one key identifier associated with the at least one recovery key and at least one recovery certificate. At block 706, method 700 includes detecting, at the recovery server, the PSD. Continuing to block 708, method includes downloading and/or transmitting, from the recovery server to the PSD, a bootable operating system image, a recovery application, at least one recovery certificate, and at least one recovery key associated with the at least one key identifier. Then, at block 710, method includes temporarily archiving the at least one recovery certificate and the at least one recovery key on the PSD. Method 700 continues to block 802 (FIG. 8).

Figure 8:
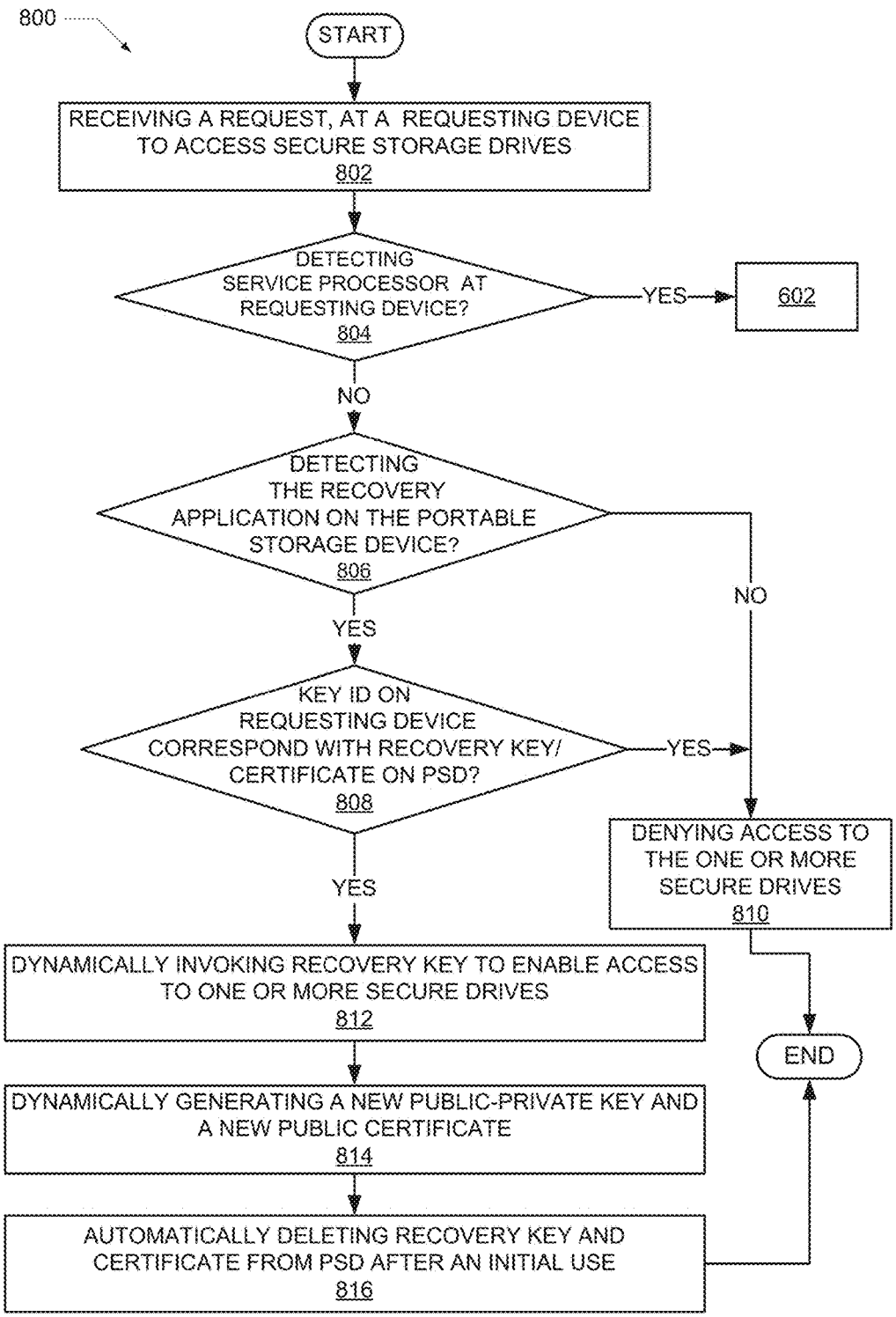
FIG. 8 is a flow chart illustrating one example of a method for accessing secure drives via a recovery key and recovery certificate archived on a portable storage device, according to one or more embodiments.

Turning now to FIG. 8, there is presented a method for accessing secure drives via a recovery key and recovery certificate archived on the PSD according to one or more embodiments. Method 800 begins at the start block and proceeds to block 802, where the method includes receiving a request from a requesting device to access one or more secure drives. At block 804, a determination is made whether a local service processor is available to process and handle the request. In response to the local service processor not being available, the processor checks the data input ports/interfaces (e.g., USB ports, disk drives, etc.) of the device to detect the recovery application on a communicatively-connected PSD (block 806). In response to the service processor being available, method 800 continues to block 602. Method 800 includes determining, at block 806, whether the recovery application is detected. Method 800 also includes, in response to not detecting the recovery application, denying access to the one or more secure drives (block 810). Method further includes, in response to detecting the recovery application, method 800 includes dynamically querying the second requesting device for at least one key identifier (block 812). Method also includes, in response to the at least one key identifier associated with the requesting device corresponding with the at least one key identifier associated with the recovery certificate and the recovery key, dynamically invoking the recovery key to enable access to one or more secure drives (block 812). Method includes, at block 814, dynamically generating a new public-private key and a new public certificate associated with the one or more secure drives. At block 816, method 800 provides automatically deleting the concealed recovery certificate and the concealed recovery key from the portable storage device after an initial successful use. The process concludes at the end block.

Figure 9:
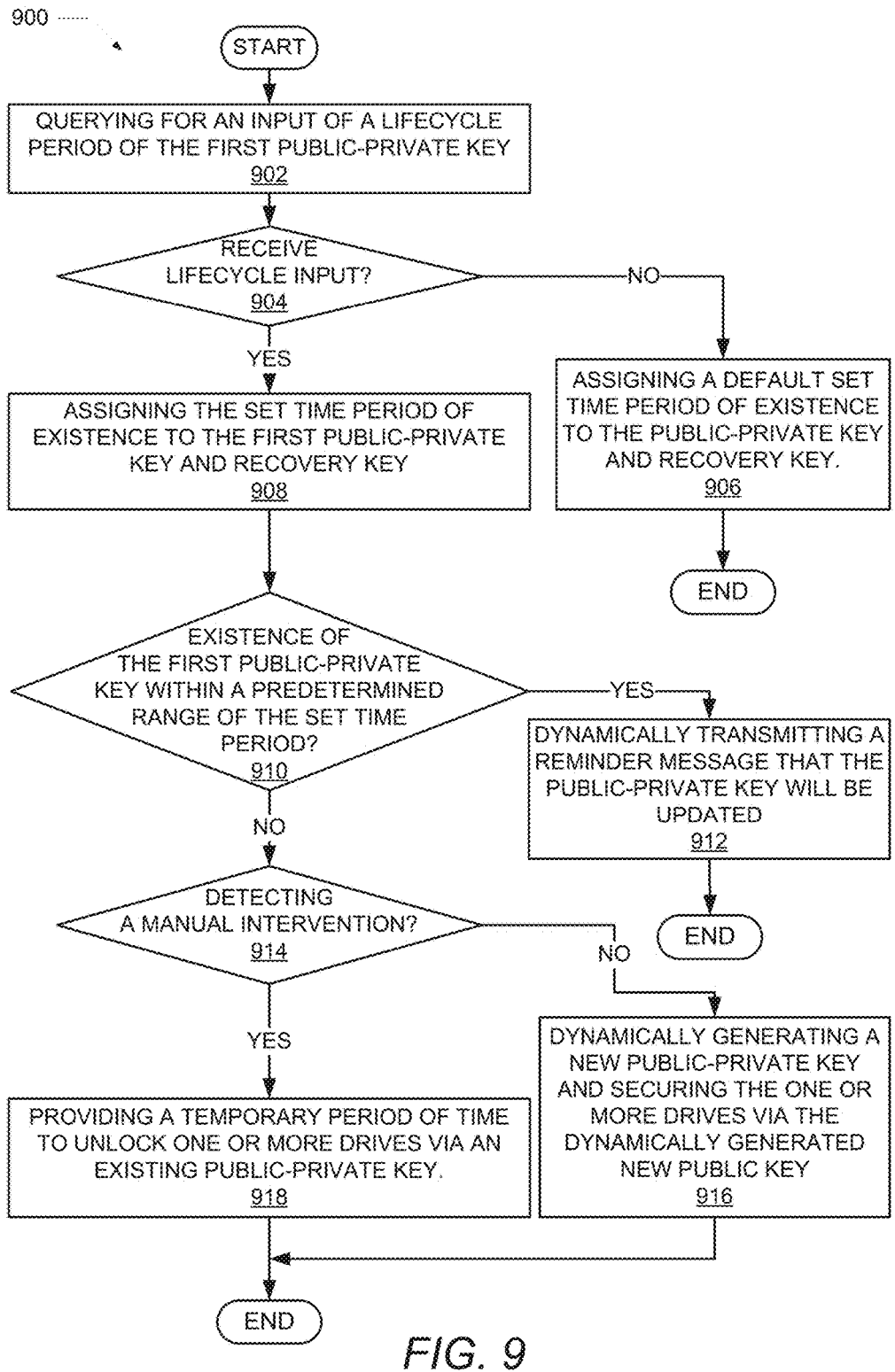
FIG. 9 is a flow chart illustrating one example of a method for associating a lifecycle period with a key and certificate in an information handling system, according to one or more embodiments.

The flow chart of FIG. 9 describes a method for associating a lifecycle period with a key and key certificate in an information handling system. Method 900 begins at the start block and proceeds to block 902, at which method 900 includes querying for an input of a lifecycle period of the first public key. According to one aspect, the lifecycle period designates a set time period of existence for the first public key, public-private key, and recovery key. At block 904, a determination is made whether a lifecycle input is received. In response to not receiving the input of the lifecycle period, method 900 includes assigning a default set time period of existence to the public key, public-private key, and recovery key (block 906). In response to receiving the input of the lifecycle period, method 900 includes assigning the set time period of existence to the first public key, public-private key, and recovery key (block 908). Method 900 continues to decision block 910 at which method includes determining whether a current period of existence of the first public key is within a predetermined range of the set time period. In response to the period of existence reaching the predetermined range, method 900 includes dynamically generating a reminder message that the public key will be updated (block 912). In response to the period of existence not reaching the predetermined range, method 900 includes determining whether one of (i) a manual intervention and (ii) an expiry of the set time period is detected (block 914). At block 916, in response to not detecting manual intervention, and thus reaching the expiry of the set time period, method includes dynamically generating a new public key and securing the one or more drives via the dynamically generated new public key. In response to detecting manual intervention prior to the expiry of the set time period at block 914, method includes providing a temporary period of time to unlock one or more drives via an existing public key (block 918). The process concludes at the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, if utilized, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method in an information handling system (IHS) for local key management setup and recovery, the method comprising:
    receiving, from a first requesting device, a lock request to secure one or more drives;
    in response to receiving the lock request, querying, by a service processor executing a security manager, for one or more key identifiers associated with the first requesting device, wherein the security manager is a module operating on the service processor;
    in response to receiving at least one key identifier at the security manager, dynamically, generating, via the service processor, a first public-private key and a first public certificate associated with the at least one key identifier;
    automatically transmitting the first public certificate to the first requesting device;
    invoking the first public-private key to secure the one or more drives;
    encrypting the public-private key to create a recovery key;
    generating a recovery certificate associated with the recovery key;
    archiving the recovery key and the recovery certificate in one or more of (i) at least one recovery server and (ii) at least one recovery database;
    assigning a lifecycle period to the first public-private key, wherein the lifecycle period designates a set time period of existence for the first public-private key and the recovery key;
    determining when a remaining period of existence of the first public-private key is within a predetermined time before an end of the lifecycle period;
    in response to the remaining period of existence being within the predetermined time, dynamically transmitting a reminder message that the public-private key will be updated;
    in response to detecting a manual intervention prior to the expiry of the lifecycle period, providing a temporary period of additional time beyond the lifecycle period to unlock the one or more drives via the first public-private key;
    detecting an expiry of the lifecycle period; and in response to detecting the expiry of the lifecycle period, dynamically generating a new public-private key and securing the one or more drives via the dynamically generated new public-private key.

2. The method of claim 1, wherein archiving the recovery key and the recovery certificate in at least one recovery server further comprises:
    receiving, at the recovery server, a request to retrieve at least one recovery key and at least one recovery certificate, the request including an input of the at least one key identifier associated with the at least one recovery key, and the at least one recovery certificate; and
    validating the at least one key identifier associated with the at least one recovery key, and at least one recovery certificate.

3. The method of claim 2, further comprising:
in response to validation of the at least one key identifier associated with the at least one recovery key and at least one recovery certificate, dynamically transmitting, from the recovery server to a communicatively-coupled, portable storage device, a bootable operating system image, a recovery application, and the at least one recovery key and the at least one recovery certificate associated with the at least one key identifier; and
temporarily archiving the at least one recovery key and the at least one recovery certificate on the portable storage device.

4. The method of claim 3, further comprising:
receiving a request at a second requesting device for access to the one or more secure drives;
determining that a service processor at the second requesting device is unavailable to respond to the request;
in response to the service processor being unavailable at the second requesting device, detecting the recovery application on the portable storage device;
in response to detecting the recovery application, dynamically querying the second requesting device for at least one key identifier;
dynamically determining whether the at least one key identifier associated with the second requesting device corresponds with the at least one key identifier associated with the at least one recovery key and the at least one recovery certificate; and
in response to the at least one key identifier associated with the second requesting device corresponding with the at least one key identifier associated with the at least one recovery key and the at least one recovery certificate, dynamically invoking the at least one recovery key and the at least one recovery certificate to enable access to the one or more secure drives associated with a respective recovery key and a respective recovery certificate.

5. The method of claim 4, wherein dynamically invoking the at least one recovery key further comprises:
dynamically generating a next public-private key and a new public certificate;
associating the next public-private key and the new public certificate with the one or more secure drives; and
automatically deleting the at least one recovery key and the at least one recovery certificate from the portable storage device, wherein the at least one recovery key and the at least one recovery certificate are single use keys that are deleted after an initial use.

6. The method of claim 1, further comprising:
receiving, at the service processor of a first requesting device, an unlock request from a second requesting device to access one or more secure drives;
dynamically searching the second requesting device for at least one key identifier and a public certificate associated with the one or more secure drives, wherein the at least one key identifier is one or more of (i) an electronic piece part identification (EPPID), unique to the requesting device, and (ii) a service tag unique to the requesting device;
in response to retrieving the at least one key identifier and the public certificate, determining whether the public certificate includes content that corresponds with the at least one key identifier;
in response to the public certificate including content that corresponds with at least one key identifier, dynamically retrieving, from the key database of the first requesting device, a public-private key associated with the one or more secure drives; and
invoking the public-private key to enable access to the one or more secure drives.

7. The method of claim 6, further comprising:
in response to the public certificate not including content that corresponds with at least one key identifier, denying access to the one or more secure drives.

8. The method of claim 1, wherein assigning the lifecycle period comprises
querying for an input of the lifecycle period of the first public-private key;
in response to receiving the input of the lifecycle period, assigning the set time period of existence to the first public-private key and the recovery key; and
in response to not receiving the input of the lifecycle period, assigning a default set time period of existence to the public-private key and the recovery key.

9. An information handling system (IHS), comprising:
a processor;
a hardware service processor;
at least one communication mechanism communicatively coupled to the service processor and which enables communication and data exchange between the service processor and at least one external electronic device and at least one storage device;
a memory system communicatively coupled to the service, processor and having stored thereon a security manager module that executes on the service processor to enable the service processor to:
receive, from a first requesting device, a lock request to secure one or more drives;
in response to receipt of the lock request to secure the one or more drives, query by a service processor executing a security manager, for one or more key identifiers associated with the first requesting device;
in response to receipt of at least one key identifier at the security manager, dynamically generate, via the service processor, a first public-private key and a first public certificate associated with the at least one key identifier;
automatically transmit the first public certificate to the first requesting device;
invoke the first public-private key to secure the one or more drives;
encrypt the public-private key to create a recovery key;
generate a recovery certificate associated with the recovery key;
archive the recovery key and the recovery certificate in one or more of: at least one recovery database and at least one recovery server;
assign a lifecycle period to the first public-private key, wherein the lifecycle period designates a set time period of existence for the first public-private key and the recovery key;
determine when a remaining period of existence of the first public-private key is within a predetermined time before an end of the lifecycle period;
in response to the remaining period of existence being within the predetermined time, dynamically transmit a reminder message that the public-private key will be updated;
in response to detection of a manual intervention prior to the expiry of the lifecycle period, provide a temporary period of additional time beyond the lifecycle period to unlock the one or more drives via the first public-private key;

detect an expiry of the lifecycle period; and in response to detection of the expiry of the lifecycle period, dynamically generate a new public-private key and secure the one or more drives via the dynamically generated new public-private key.

10. The IHS of claim 9, wherein the security manager module further enables the service processor to:
receive, at the recovery server, a request to retrieve at least one recovery key, and at least one recovery certificate, the request including an input of the at least one key identifier associated with the at least one recovery key, and the at least one recovery certificate; and
validate the at least one key identifier associated with the at least one recovery key, and at least one recovery certificate.

11. The IHS of claim 10, wherein the security manager module further enables the service processor to:
in response to validation of the at least one key identifier associated with the at least one recovery key and at least one recovery certificate, dynamically transmit, from the recovery server to a communicatively-coupled portable storage device, a bootable operating system image, a recovery application, and the at least one recovery key and the at least one recovery certificate associated with the at least one key identifier; and
temporarily archive the at least one recovery key and the at least one recovery certificate on the portable storage device.

12. The IHS of claim 11, wherein the security manager module executing from the portable storage device, enables a processor at a second requesting device to:
receive a request at a second requesting device for access to the one or more secure drives;
determine that the service processor at the second requesting device is unavailable to respond to the request;
in response to the service processor being unavailable at a second requesting device, detect the recovery application on the portable storage device;
in response to detection of the recovery application, dynamically query the second requesting device for at least one key identifier;
dynamically determine whether the at least one key identifier associated with the second requesting device corresponds with the at least one key identifier associated with the at least one recovery key and the at least one recovery certificate; and
in response to the at least one key identifier associated with the second requesting device corresponding with the at least one key identifier associated with the at least one recovery key and the at least one recovery certificate, dynamically invoke the at least one recovery key and the at least one recovery certificate to enable access to the one or more secure drives associated with a respective recovery key and a respective recovery certificate.

13. The IHS of claim 11, wherein the security manager module executing from the portable storage device, enables a processor at a second requesting device to:
dynamically generate a next public-private key and a new public certificate;
associate the next public-private key and the new public certificate with the one or more secure drives; and
automatically delete the at least one recovery key and the at least one recovery certificate from the portable storage device, wherein the at least one recovery key and the at least one recovery certificate are single use keys that are deleted after an initial use.

14. The IHS of claim 9, wherein the security manager module further enables the service processor to:
receive, at the service processor, an unlock request from a second requesting device to access one or more secure drives;
dynamically search the second requesting device for at least one key identifier and a public certificate associated with the one or more secure drives, wherein the at least one key identifier is one or more of (i) an electronic piece part identification (EPPID), unique to the requesting device, and (ii) a service tag unique to the requesting device;
in response to retrieval of the at least one key identifier and the public certificate, determining whether the public certificate includes content that corresponds with the at least one key identifier;
in response to the public certificate including content that corresponds with at least one key identifier, dynamically retrieve, from the key database of the first requesting device, a public-private key associated with the one or more secure drives; and
invoke the public-private key to enable access to the one or more secure drives.

15. The IHS of claim 9, wherein the security manager module further enables the service processor to:
in response to the public certificate not including content that corresponds with at least one key identifier, deny access to the one or more secure drives.

16. The IHS of claim 9, wherein to assign the lifecycle period, the security manager module further enables the service processor to:
query for an input of the lifecycle period of the first public-private key;
in response to receipt of the input of the lifecycle period, assign the set time period of existence to the first public-private key and the recovery key; and
in response to no receipt of the input of the lifecycle period, assign a default set time period of existence to the public-private key and the recovery key.

17. The method of claim 1, further comprising:
assigning the first public-private key and the first public certificate to the one or more drives;
concealing contents of the first public-private key; and
archiving the public-private key in a key database.

18. The IHS of claim 9, wherein the security manager module further enables the service processor to:
assign the first public-private key and the first public certificate to the one or more drives;
conceal contents of the first public-private key; and
archive the public-private key in a key database.

* * * * *